US010168786B2

(12) United States Patent
Hirano et al.

(10) Patent No.: US 10,168,786 B2
(45) Date of Patent: Jan. 1, 2019

(54) GESTURE GUIDANCE DEVICE FOR MOVING PLATFORM, GESTURE GUIDANCE SYSTEM FOR MOVING PLATFORM, AND GESTURE GUIDANCE METHOD FOR MOVING PLATFORM

(71) Applicant: MITSUBISHI ELECTRIC CORPORATION, Tokyo (JP)

(72) Inventors: Takashi Hirano, Tokyo (JP); Taro Kumagai, Tokyo (JP); Shuhei Ota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 15/112,980

(22) PCT Filed: Feb. 18, 2014

(86) PCT No.: PCT/JP2014/053769
§ 371 (c)(1),
(2) Date: Jul. 20, 2016

(87) PCT Pub. No.: WO2015/125213
PCT Pub. Date: Aug. 27, 2015

(65) Prior Publication Data
US 2016/0334879 A1 Nov. 17, 2016

(51) Int. Cl.
*G06F 3/01* (2006.01)
*G06K 9/00* (2006.01)
*G06K 9/62* (2006.01)
*G06F 3/042* (2006.01)
*G06F 3/0488* (2013.01)

(52) U.S. Cl.
CPC ............ *G06F 3/017* (2013.01); *G06F 3/0426* (2013.01); *G06F 3/04886* (2013.01); *G06K 9/00355* (2013.01); *G06K 9/6215* (2013.01)

(58) Field of Classification Search
None
See application file for complete search history.

(56) References Cited

U.S. PATENT DOCUMENTS

2005/0212765 A1* 9/2005 Ogino ..................... G06F 3/011
345/156
2012/0007857 A1 1/2012 Noda et al.
(Continued)

FOREIGN PATENT DOCUMENTS

DE 102012216193 A1 5/2014
DE 102014201578 A1 7/2015
(Continued)

*Primary Examiner* — Asher D Kells
(74) *Attorney, Agent, or Firm* — Birch, Stewart, Kolasch & Birch, LLP

(57) ABSTRACT

An emphasis level R is calculated in accordance with a difference between a position of a hand of an operator A specified based on a detection signal of a 3D camera 6 and a predetermined position of a hand for performing a gesture operation. A notification of a presence of an operation object intended for the gesture operation is provided with the calculated emphasis level R to thereby guide the hand of the operator A to a predetermined position of a hand, every time the emphasis level R is calculated in response to the detection of the hand of the operator A by the 3D camera 6.

18 Claims, 8 Drawing Sheets

(56) References Cited

U.S. PATENT DOCUMENTS

| | | | |
|---|---|---|---|
| 2013/0181897 A1 | 7/2013 | Izumi | |
| 2013/0257750 A1* | 10/2013 | Nicholson | G06F 3/017 345/173 |
| 2014/0181759 A1* | 6/2014 | Kim | B60K 35/00 715/863 |
| 2015/0125043 A1* | 5/2015 | Kimura | G06F 3/017 382/106 |
| 2015/0234469 A1* | 8/2015 | Akiyoshi | G06F 3/017 345/156 |
| 2015/0234470 A1* | 8/2015 | Rosenstock | G06F 3/017 701/36 |

FOREIGN PATENT DOCUMENTS

| | | |
|---|---|---|
| JP | 2005-234676 A | 9/2005 |
| JP | 2005-280396 A | 10/2005 |
| JP | 2012-18559 A | 1/2012 |
| JP | 2013-16060 A | 1/2013 |

\* cited by examiner (a)        (b)        (c)

(a)

(b)

GESTURE GUIDANCE DEVICE FOR MOVING PLATFORM, GESTURE GUIDANCE SYSTEM FOR MOVING PLATFORM, AND GESTURE GUIDANCE METHOD FOR MOVING PLATFORM

FIELD OF THE INVENTION

The present invention relates to a gesture guidance device for a moving platform, a gesture guidance system for a moving platform, and a gesture guidance method for a moving platform, which recognize gestures of an operator inside a moving platform.

BACKGROUND OF THE INVENTION

Systems have been proposed for recognizing a gesture made by an operator to operate a device positioned away from the operator inside a moving platform. In these kind of systems, it is important to make the operator grasp a spatial position in which a gesture is to be made, because it is required to correctly recognize the gesture for an operation.

For example, Patent reference 1 discloses a system in which a virtual image of an operation system such as an operation switch and/or a button is displayed in a space by using hologram technology or the like, and a gesture made against the virtual image is recognized as an operation to the device. In this system, a gesture can be made in the situation as if the virtual image displayed in the space appears as a real operation system of a device to be operated. Therefore, an operator can easily grasp that the position where the virtual image is displayed is the spatial position in which a gesture is to be made.

Furthermore, in an invention disclosed in Patent reference 2, when a finger of an operator is detected in a space on the straight line connecting between a viewpoint position of an operator and an operation object, it is recognized that the operation object is being operated. This enables the operator to grasp a spatial position in which a gesture is to be made, based on a three-dimensional positional relation between the viewpoint and the operation object.

PATENT REFERENCES

Patent reference 1: Japanese Patent Application Publication No. 2005-234676.
Patent reference 2: Japanese Patent Application Publication No. 2005-280396.

SUMMARY OF THE INVENTION

Problems to be Solved by the Invention

In Patent reference 1, a specific device is required to display the virtual image of the operation system such as an operation switch and/or a button by using hologram technology or the like. Therefore, there may be the problem that the system configuration is complicated and its cost is increased.

Furthermore, in Patent reference 2, since an operator grasp the spatial position in which a gesture is to be made, based on the operator's viewpoint, the spatial position in which a gesture is to be made varies depending on the movement of the operator's head. Therefore, when the operator's viewpoint is erroneously detected due to the movement of the head, the operator cannot grasp the position in which a gesture is to be made, thus possibly failing to perform a correct operation.

The present invention is made to solve the above-described problems, and an object of the present invention is to provide a gesture guidance device for a moving platform, a gesture guidance system for a moving platform, and a gesture guidance method for a moving platform, which can be implemented by a simple configuration and can perform a guidance to an appropriate state in which a gesture operation is to be performed.

Means for Solving the Problem

According to the invention, there is provided a gesture guidance device for a moving platform, which includes: an emphasis level calculator to specify a position and a shape of a hand of an operator based on information detected by a sensor that detects the hand of the operator, and to calculate an emphasis level in accordance with a difference between a combination of the position and the shape of the hand of the operator and another combination of a predetermined position for performing a gesture operation and a predetermined shape of a hand for the gesture operation; and a notification controller to, every time the emphasis level calculator calculates the emphasis level in response to detection of the hand of the operator by the sensor, cause a notification device to provide a notification of a presence of an operation object intended for the gesture operation, with the calculated emphasis level, to thereby guide the hand of the operator to the predetermined position and the predetermined shape of a hand for the gesture operation.

Advantageous Effect of the Invention

According to the present invention, there is the effect that the invention can be implemented by a simple configuration and can perform guidance to an appropriate state in which a gesture operation is to be performed.

EMBODIMENTS OF THE INVENTION

In the following, embodiments to carry out the present invention will be described in accordance with the attached drawings in order to describe the present invention more in detail.

First Embodiment

Figure 1:
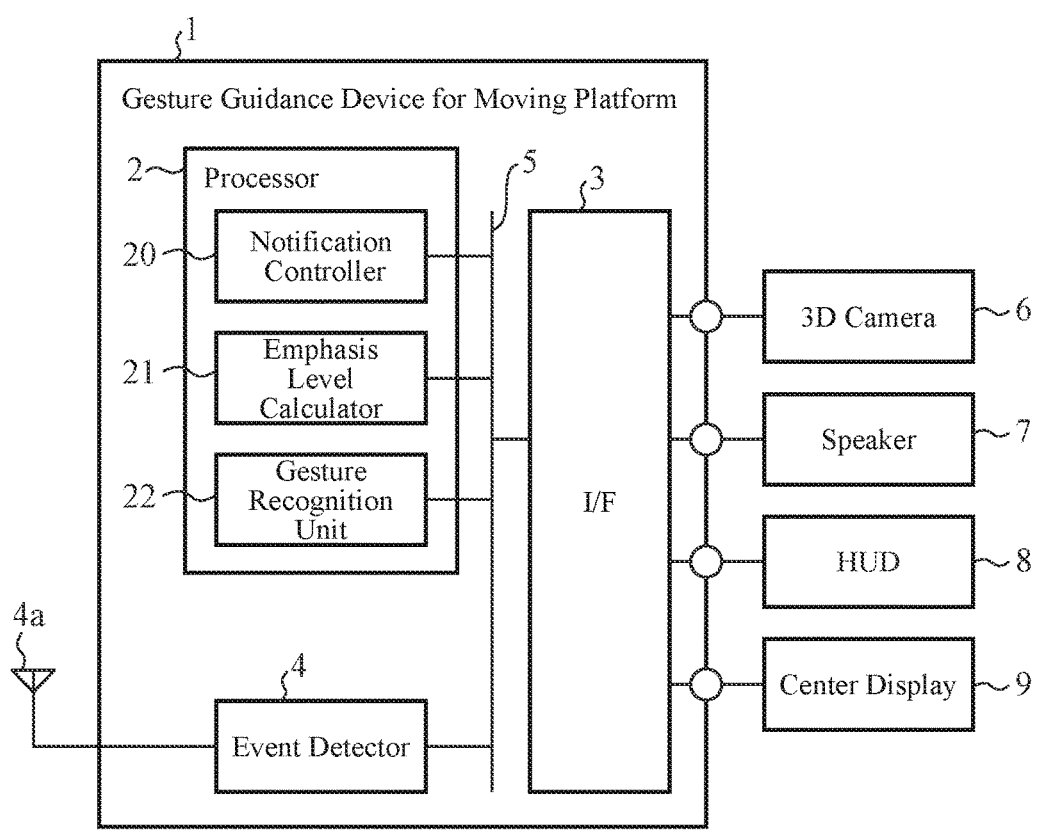
FIG. 1 is a block diagram illustrating a configuration of a gesture guidance device for a moving platform according to a first embodiment.

FIG. 1 is a block diagram illustrating a configuration of a gesture guidance device for a moving platform according to a first embodiment. When an operator boarding a moving platform such as a vehicle performs a gesture operation against an operation object, a gesture guidance device 1 for a moving platform guides a hand of the operator to a predetermined gesture performance region and guides the hand to a predetermined shape of a hand.

In FIG. 1, the gesture guidance device 1 for a moving platform includes a calculator 2, an interface (I/F) 3, and an event detector 4, and these components are connected to one another via a bus 5.

Furthermore, the gesture guidance device 1 for a moving platform is connected to a 3D camera 6, a speaker 7, a head-up display (HUD) 8, and a center display 9 via the I/F 3.

The calculator 2 is equivalent to a CPU mounted on the gesture guidance device 1 for a moving platform, and performs calculation processing in various kinds of control. Furthermore, as illustrated in FIG. 1, the calculator 2 includes a notification controller 20, an emphasis level calculator 21, and a gesture recognition unit 22. For example, the notification controller 20, emphasis level calculator 21, and gesture recognition unit 22 are implemented by a CPU and programmed by software.

Every time the emphasis level calculator 21 calculates an emphasis level in response to detection of a hand of the operator by the 3D camera 6, the notification controller 20 causes the notification device to provide a notification of a presence of an operation object intended for a gesture operation, with the calculated emphasis level, to thereby guide the hand of the operator to a predetermined position and to a predetermined shape of a hand for the gesture operation. Here, the operation object is, for example, a device or an application to be an object intended for a gesture operation.

Furthermore, the notification device is a device to notify the operator of the operation object, and is equivalent to the speaker 7, HUD 8, and center display 9 in FIG. 1. More specifically, notification modes for the operation object includes a notification using a sound output from the speaker 7, and a notification using a display item to be displayed by the HUD 8 or by the center display 9.

In this case, in the case of the notification using the sound, the sound volume, sound type, and the like of a notification sound are changed in accordance with the emphasis level. In the case of the notification using the display item, the transparency, color, size, shape, and the like of the display item are changed in accordance with the emphasis level.

The emphasis level calculator 21 specifies the position and shape of the hand of the operator based on detected information of the hand of the operator, and calculates an emphasis level in accordance with a difference between a combination of the position and shape of the hand of the operator and another combination of a position and a predetermined shape of a hand for performing a gesture operation.

For example, an emphasis level is calculated using a quantified difference between the position of the hand of the operator and the position of the gesture performance region, and using a dissimilarity obtained by quantifying a difference between the shape of the hand of the operator and the predetermined shape of a hand for a gesture operation of the operation object. At this point, the emphasis level calculator 21 calculates the emphasis level such that the closer to the gesture performance region the hand of the operator is and the more similar to the predetermined shape of a hand of the operator is, the larger a value of the emphasis level becomes.

Consequently, the closer to the gesture performance region predetermined for the operation object the hand of the operator approaches, the more emphasized the notification of the presence of the operation object is. Therefore, when the operator moves the hand in a direction in which the presence of the operation object becomes emphasized, the hand of the operator is guided to the predetermined position of a hand (gesture performance region) to perform the gesture operation, and is guided to the predetermined shape of a hand for the gesture operation.

The I/F 3 is an interface for relay to transmit/receive information between the gesture guidance device 1 for a moving platform and the 3D camera 6, speaker 7, HUD 8, and center display 9. In this regard, a gesture guidance system for guiding the hand of the operator to the gesture performance region and to the predetermined shape of a hand is formed of the gesture guidance device 1 for a moving platform, 3D camera 6, speaker 7, HUD 8, and center display 9.

The event detector 4 detects an event from the outside via an antenna 4a and the bus 5. The event means generation of information to be provided to a user by a notification, indicating, for example, an e-mail receipt from a source outside a vehicle, detected by using the antenna 4a, and/or shortage information of gasoline acquired from an on-vehicle sensor (not illustrated).

The 3D (three-dimensional) camera 6 is a sensor to detect a hand of the operator. For example, from the detected information of the 3D camera 6, image information is obtained to specify a spatial position of the hand of the operator (depth information) and a shape of the hand within a photographing visual field. The emphasis level calculator 21 receives such information as detected information of the 3D camera 6, and specifies the position and shape of the hand of the operator.

The 3D camera 6 can be implemented by using, for example, a stereo camera or a time of flight (TOF) camera.

The speaker 7 is a notification device to provide an acoustic notification of a presence of the operation object by sound output. In addition, the HUD 8 and the center display 9 are notification devices to provide a visual notification by displaying a display item corresponding to the operation object. In this regard, the HUD 8 is a display to project and display information on a projection plate or the like provided on a front window on a front side of a driver's seat or provided between a handle and the front window. The center display 9 is a display arranged near a center portion of an instrument panel on a front side of a vehicle interior.

Meanwhile, in the example illustrated in FIG. 1, the gesture guidance device 1 for a moving platform includes the gesture recognition unit 22, and the gesture recognition unit 22 is adapted to recognize a gesture operation of the operator in the gesture performance region, but not limited thereto.

Specifically, a component to recognize a gesture operation may also be provided as a device separate from the gesture guidance device 1 for a moving platform, and may recognize the gesture operation by cooperatively operating with the notification controller 20 and the emphasis level calculator 21.

Furthermore, the example in which the gesture guidance device 1 for a moving platform guides the hand of the operator to the predetermined hand position to perform a gesture operation (gesture performance region) and also guides the hand to the predetermined shape of a hand for the gesture operation has been described, but not limited thereto.

For example, the emphasis level calculator 21 specifies only the position of the hand of the operator based on the detected information of the sensor, and calculates the emphasis level in accordance with the difference between the position of the hand of the operator and the gesture performance region.

Then, every time the emphasis level calculator 21 calculates an emphasis level in response to detection of the hand of the operator by the sensor, the notification controller 20 causes the notification device to provide a notification of the presence of the operation object intended for the gesture operation, with the calculated emphasis level, to thereby guide the hand of the operator to the predetermined position.

Next, operation will be described.

Figure 2:
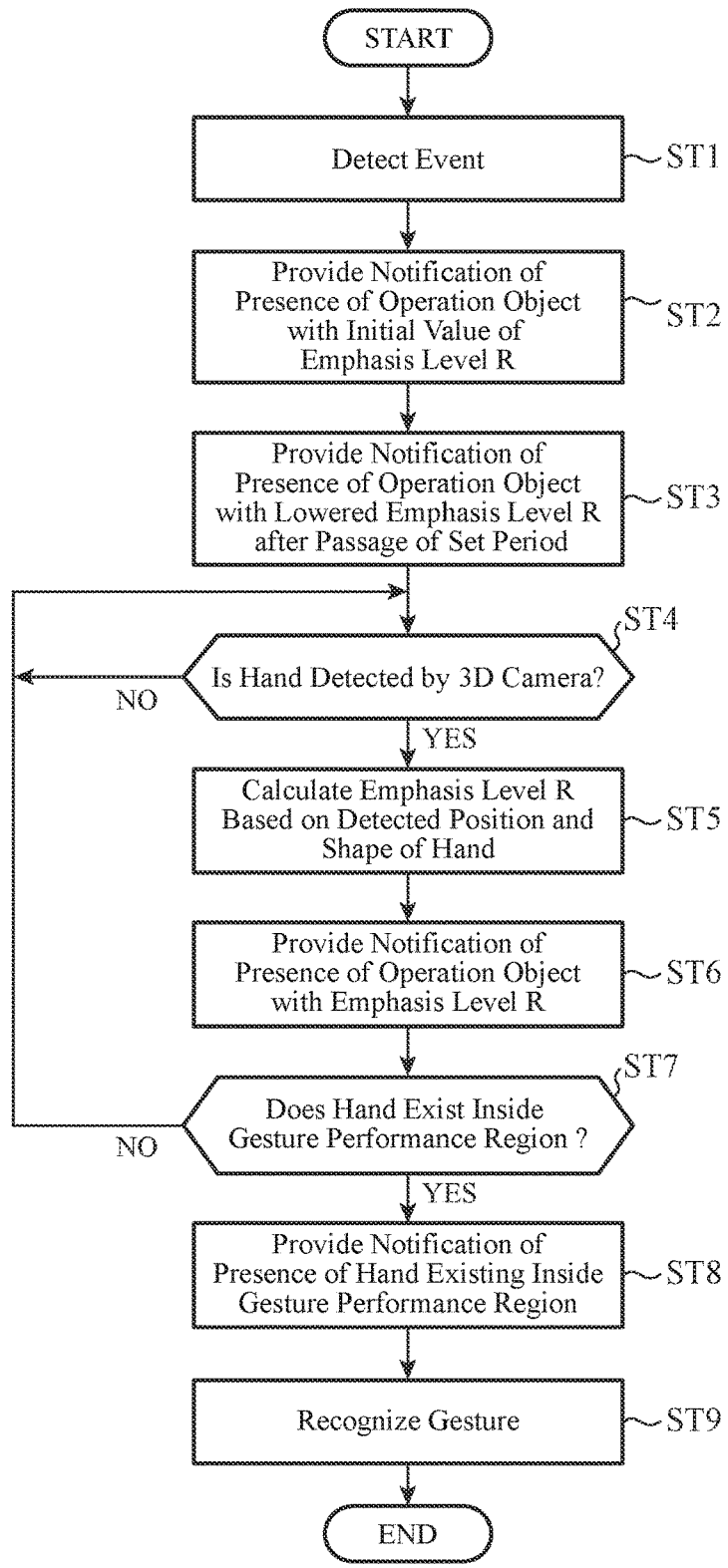
FIG. 2 is a flowchart illustrating an operation of the gesture guidance device for a moving platform according to the first embodiment.

FIG. 2 is a flowchart illustrating the operation of the gesture guidance device for a moving platform according to the first embodiment, and a description will be provided in accordance with a procedure of the flowchart illustrated in FIG. 2.

First, the event detector 4 detects an event (Step ST1). When receiving the information of the event detected from the event detector 4, the emphasis level calculator 21 outputs an initial value predetermined as an emphasis level R to the notification controller 20. In this regard, the initial value of the emphasis level R is the highest emphasis level or a value equivalent thereto in order to make a user easily recognize an operation object corresponding to this event at the time of event generation.

The notification controller 20 controls the notification device to provide the notification of the presence of the operation object corresponding to the event with the initial value of the emphasis level R. More specifically describing, based on information related to the event detected by the event detector 4 and the initial value of the emphasis level R received from the emphasis level calculator 21, the notification controller 20 specifies the operation object corresponding to the event, and outputs a notification command to provide the notification of a presence of the specified operation object with the initial value of the emphasis level R. The notification command is output to the notification device (speaker 7, HUD 8, and/or center display 9) via the I/F 3. In accordance with the notification command, the speaker 7, HUD 8, and/or center display 9 provides the notification of the presence of the operation object corresponding to the event with the initial value of the emphasis level R (Step ST2).

Figure 3:
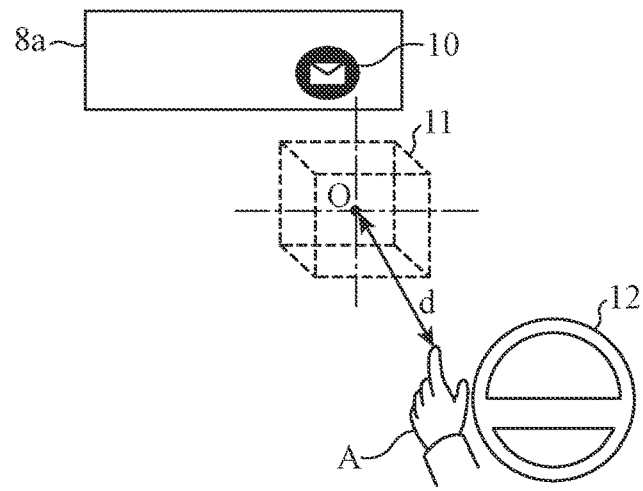
FIG. 3 is a diagram illustrating positional relations among a hand of an operator, an operation object, and a gesture performance region.

FIG. 3 is a diagram illustrating positional relations among the hand of the operator, an operation object, and a gesture performance region. In FIG. 3, an operator A is a driver who drives with a handle 12. For example, in the case where the event is e-mail receipt, an icon 10 corresponding to this e-mail receipt is indicated on a projection member 8a (front window or projection plate) of the HUD 8. Here, the icon 10 is the operation object to be an object intended for a gesture operation. Since the initial value of the emphasis level R is set immediately after the e-mail receipt, the icon 10 is clearly indicated such that the operator A can easily visually recognize the icon. For example, the icon 10 is indicated with lowest transparency.

When the event related to the operation object is generated and the notification device provides the notification of the presence of the operation object with the initial value of the emphasis level R as described above, if a set period has passed from the event generation, the emphasis level calculator 21 sequentially calculates the emphasis level R that is gradually lowered from the initial value of the emphasis level R. The notification controller 20 controls the notification device to provide a notification of the presence of the operation object with the emphasis level R that is sequentially calculated by the emphasis level calculator 21. With this configuration, the notification device provides the notification of the presence of the operation object with the emphasis level R that is gradually lowered (Step ST3).

When the hand of the operator A who performs a gesture operation against the operation object is not detected, even after the set period has passed after the event is generated and the notification of the presence of the operation object is provided as described above, the notification of the presence of the operation object is provided with the emphasis level R gradually being lowered. This can prevent the notification of the presence of the operation object from being kept provided unnecessarily with the high emphasis level R.

For example, in the case where the icon 10 is displayed on the projection member 8a of the HUD 8, the icon 10 is displayed in a manner superimposed on front eyesight of the operator, and blocks the eyesight of the operator.

To address this situation, when the hand of the operator A is not detected even after the set period has passed, the emphasis level R is gradually lowered, and the icon 10 is displayed with increasing transparency in accordance therewith. Thus, the icon 10 becomes gradually invisible, and the eyesight of the driver can be prevented from being blocked.

Meanwhile, in the case where the hand of the operator A is not detected even after a predetermined set period has additionally passed after the above passage of the above set period, it can be determined that the operator A has no intention to operate, and a notification of the presence of the operation object may be stopped.

Before the above set period passes from the event generation, or while the notification device provides the notification of the presence of the operation object with the emphasis level R gradually lowered after passage of the above set period, the emphasis level calculator 21 is in a state of waiting for detection of the hand of the operator A by the 3D camera 6. Here, when the hand of the operator A is not detected (Step ST4: NO), this state of waiting for detection continues.

When the hand of the operator A is detected by the 3D camera 6 (Step ST4: YES), the emphasis level calculator 21 specifies the position and shape of the hand of the operator A based on the detected information of the 3D camera 6. The detected information of the 3D camera 6 is a 3D image obtained by the 3D camera 6, and a two-dimensional image of the hand of the operator A and depth coordinates of each of pixels of the image can be obtained from this 3D image.

The position of the hand (spatial position) and shape of the hand of the operator A are specified based on the information.

Next, the emphasis level calculator 21 calculates the emphasis level R in accordance with a difference between the specified position of the hand of the operator A and a position of the predetermined gesture performance region 11, and a dissimilarity between the specified shape of the hand of the operator A and a predetermined shape of a hand for the gesture operation of the operation object (Step ST5). Here, the gesture performance region 11 is arranged between the operator A and the icon 10 that is the operation object as illustrated in FIG. 3. This enables the operator A to intuitively perform the gesture operation while visually recognizing the operation object.

Furthermore, the emphasis level R is calculated in accordance with formula (1) described below. In the following formula (1), d represents a distance from the coordinates of a center O of the gesture performance region 11 to the coordinates of the position of the hand of the operator A as illustrated in FIG. 3. Note that the distance d is a value of zero or larger when the hand of the operator A is located at the center O. In addition, s represents the dissimilarity between the shape of the hand of the operator A and the predetermined shape of a hand for the gesture operation of the operation object. The more different the mutual shapes are, the larger positive value the dissimilarity s is to have. Furthermore, $\alpha$ and $\beta$ are positive coefficients, and the distance d of the emphasis level R and a contribution degree of the dissimilarity s are set by $\alpha$ and $\beta$.

In the case where the shape of the hand of the operator A is not guided to the predetermined shape of a hand for the gesture operation although the hand of the operator A is guided to the gesture performance region 11, more specifically, in the case of not considering the dissimilarity s in calculating the emphasis level R, the coefficient $\beta$ may be set to zero, for example.

$$R = 1/(\alpha \cdot d + \beta \cdot s) \quad (1)$$

Figure 4:
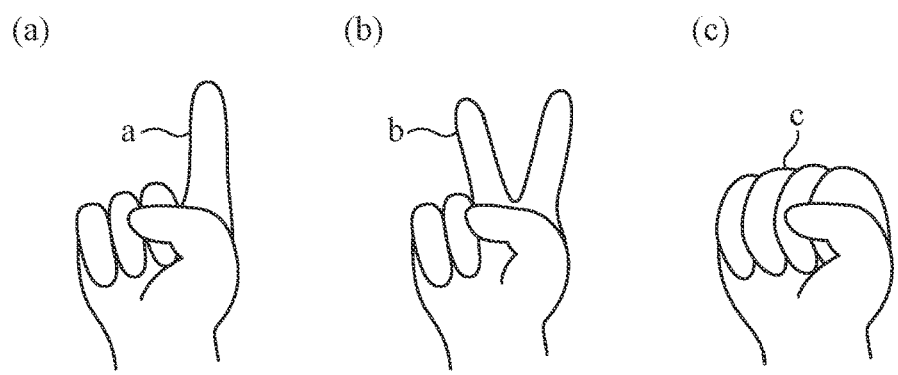
FIGS. 4(a) to 4(c) are diagrams illustrating shapes of the hand of the operator.

FIGS. 4(a) to 4(c) are diagrams illustrating the shapes of the hand of the operator. For example, in the case where the predetermined shape of a hand for the gesture operation of the operation object is a shape a illustrated in FIG. 4(a), and in the case where the shape of the hand of the operator A is similar to the shape a, the dissimilarity s becomes a small value. On the other hand, in the case where the shape of the hand of the operator A is a shape b illustrated in FIG. 4(b) or a shape c illustrated in FIG. 4(c), the dissimilarity s becomes a large value. Consequently, in the case where the hand of the operator A is located outside the gesture performance region 11 or the shape of the hand is different from the predetermined shape of a hand, the emphasis level R calculated in accordance with the above formula (1) becomes a small value. More specifically, according to the formula (1), the closer to the inside of the gesture performance region 11 the hand of the operator A approaches and the more similar to the predetermined shape of a hand of the operator A is, the emphasis level R becomes a large value.

The notification controller 20 controls the notification device to provide the notification of the presence of the operation object, with the emphasis level R calculated by the emphasis level calculator 21 in Step ST5. Consequently, the notification device provides the notification of the presence of the operation object with the emphasis level R (Step ST6). The processing from Step ST4 to Step ST6 is repeated until the hand of the operator A enters inside the gesture performance region 11 (until the distance d becomes 0). More specifically, when the hand of the operator A is sequentially detected by the 3D camera 6 during a period of repeating the above-described processing, every time the emphasis level calculator 21 calculates an emphasis level R in response to the sequential detection, the notification controller 20 controls the notification device to provide a notification of the presence of the operation object with the calculated emphasis level R. In accordance with control of the notification controller 20, the notification device provides the notification of a presence of the operation object with the emphasis level R sequentially calculated by the emphasis level calculator 21.

Figure 5:
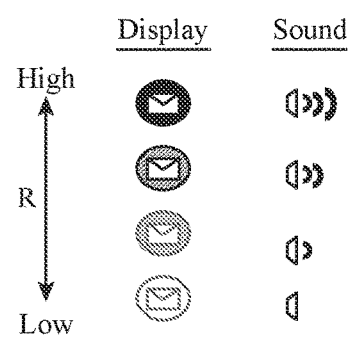
FIG. 5 is a diagram illustrating notification modes for the operation object according to the first embodiment.

FIG. 5 is a diagram illustrating notification modes for the operation object in the first embodiment, and illustrating a case of providing a notification of the presence of the operation object corresponding to e-mail receipt. As illustrated in FIG. 5, in the case where the emphasis level R is maximal, an icon corresponding to the e-mail receipt is displayed with minimal transparency. Also, The volume of a notification sound to provide the notification of the e-mail receipt is set maximal. In contrast, in the case where the emphasis level R is minimal, the icon corresponding to the e-mail receipt is displayed with maximal transparency, and the volume of the notification sound to provide notification of the e-mail receipt is set minimal. The notification device outputs the icon display and the notification sound with the emphasis level R sequentially calculated by the emphasis level calculator 21 in accordance with the position and the shape of the hand of the operator A. The hand of operator A is guided to the gesture performance region 11 by the hand of the operator A being moved in a direction in which the icon is more clearly displayed and the notification sound becomes louder.

Upon calculating the emphasis level R based on the detected information of the 3D camera 6, the emphasis level calculator 21 determines whether the hand of the operator A exists inside the gesture performance region 11 based on the distance d (Step ST7). Here, when the hand of the operator A has not entered inside the gesture performance region 11 (Step ST7: NO), the processing proceeds to Step ST4.

Meanwhile, in the case where entrance of the hand of the operator A inside the gesture performance region 11 is not detected even after the set period has passed from event generation, the emphasis level calculator 21 sequentially calculates the emphasis level R such that the emphasis level R is gradually lowered, and the notification controller 20 may control the notification device to provide a notification of a presence of the operation object with the emphasis level R that is sequentially calculated by the emphasis level calculator 21. This also can prevent consecutive notifications of the presence of the unnecessary operation object.

On the other hand, in the case where the hand of the operator A is inside the gesture performance region 11 (Step ST7: YES), the emphasis level calculator 21 notifies the notification controller 20 of this fact.

At the time of receiving the above notification from the emphasis level calculator 21, the notification controller 20 controls and causes the notification device to provide the notification of a presence of the hand of the operator A being inside the gesture performance region 11 (Step ST8). For example, a special sound is output from the speaker 7, or a special display is provided at the operation object. Consequently, the operator A can recognize that the gesture operation has become recognizable in the gesture guidance device 1 for a moving platform.

After that, the gesture recognition unit 22 recognizes a gesture operation such as fingertip turning, hand waving, and special shape of the hand, performed by the hand of the operator A inside the gesture performance region 11 (Step ST9). Thus, processing in accordance with a recognition result of the gesture operation is performed.

For example, in the case where the event is e-mail receipt, the processing such as "selection" which provides a command to read the e-mail or "cancellation" which suspends opening the e-mail and finishes the notification is performed.

Meanwhile, in the case where the gesture operation such as "hand moving in a right direction" indicating that the operation object is not necessary is recognized by the gesture recognition unit 22, the notification controller 20 controls and causes the notification device to finish the notification of the presence of the operation object. More specifically, display of the operation object is erased or output of the notification sound is stopped. This also can prevent consecutive notifications of the presence of the unnecessary operation object. For example, in the HUD 8, an unnecessary operation object that blocks the eyesight of the driver can be erased.

In the case where the gesture recognition unit 22 cannot recognize the gesture operation and also the hand of the operator A moves out from the gesture performance region 11, the notification controller 20 controls and causes the notification device to output a special sound or special display thereby notifying the operator A of a state that the gesture operation has become not recognizable. This enables the operator A to intuitively grasp the fact that the hand has moved out of the gesture performance region 11, and the processing immediately can proceed to the processing from the Step ST4.

Furthermore, in the gesture guidance device 1 for a moving platform according to the first embodiment, the gesture recognition unit 22 recognizes the gesture operation performed in the gesture performance region 11 with one-to-one correspondence between the operation object and the gesture performance region 11, as illustrated in FIG. 3. For example, if different operation objects correspond to one common gesture performance region, the gesture operation for each of the operation objects is needed to be performed in the common gesture performance region. In this case, if a different gesture operation corresponds to each of the operation objects, an operation mistake is likely to occur. Therefore, with one-to-one correspondence between the operation object and the gesture performance region 11, the operator A is only to perform the gesture operation corresponding to the operation object in the gesture performance region for each of the operation objects. This can reduce occurrence of an operation mistake.

As described above, according to the first embodiment, the emphasis level calculator 21 specifies the position of the hand of the operator A based on a detection signal of the 3D camera 6, and calculates the emphasis level R in accordance with the difference between the position of the hand of the operator A and the predetermined position of a hand to perform the gesture operation. Every time the emphasis level calculator 21 calculates the emphasis level R in response to detection of the hand of the operator A by the 3D camera 6, the notification controller 20 causes the notification device to provide the notification of the presence of the operation object intended for the gesture operation with the calculated emphasis level R to thereby guide the hand of the operator A to the predetermined position.

Especially, the emphasis level calculator 21 calculates the emphasis level R in accordance with the distance d between the position of the hand of the operator A and the center position of the gesture performance region 11 predetermined to perform the gesture operation.

With this configuration, there is no need to display a virtual image of the operation object by using hologram or the like in order to recognize the gesture operation of the operation object, and the gesture guidance device 1 for a moving platform can be implemented by a simple configuration. Furthermore, the operator A moves the hand in the direction in which notification of the presence of the operation object becomes emphasized, thereby guiding the hand of the operator A to the predetermined hand position to perform the gesture operation (gesture performance region). As a result, the hand of the operator A is guided to an appropriate position in which the gesture operation is to be performed, and recognition accuracy of the gesture operation can be improved.

Furthermore, according to the first embodiment, the emphasis level calculator 21 further specifies the shape of the hand of the operator A based on the detected information of the 3D camera 6, and calculates the emphasis level R in accordance with the difference between the position and shape of the hand of the operator A and the predetermined position to perform the gesture operation and the predetermined shape of a hand for the gesture operation. The notification controller 20 causes the notification device to provide the notification of a presence of the operation object intended for the gesture operation with the emphasis level R calculated by the emphasis level calculator 21, to thereby guide the hand of the operator A to the predetermined position and to the predetermined shape of a hand for the gesture operation.

Especially, the emphasis level calculator 21 calculates the emphasis level R in accordance with: the distance d between the position of the hand of the operator A and the center position of the gesture performance region 11; and the dissimilarity s between the shape of the hand of the operator A and the predetermined shape of a hand for the gesture operation of the operation object.

With this configuration, the hand of the operator A can be guided to the gesture performance region 11 in which the gesture operation is to be performed, and further guided to the predetermined shape of a hand for the gesture operation. This can guide the hand of the operator A to an appropriate state in which the gesture operation is to be performed, and can improve recognition accuracy of the gesture operation.

Furthermore, according to the first embodiment, when an event related to the operation object is generated causing a notification device to provide a notification of a presence of the operation object, the emphasis level calculator 21 sequentially calculates an emphasis level R that is gradually lowered after a set period has passed from the generation of the event. The notification controller 20 controls the notification device to provide a notification of the presence of the operation object with the emphasis level R that is sequentially calculated by the emphasis level calculator 21. This can prevent consecutive notifications of the presence of the unnecessary operation object.

Moreover, according to the first embodiment, the gesture recognition unit 22 recognizes the gesture operation performed by the hand of the operator A inside the gesture performance region 11, with one-to-one correspondence between the operation object and the gesture performance region 11. Then, the operator A is only to perform the gesture operation corresponding to the operation object in the gesture performance region of each operation object. This can reduce occurrence of an operation mistake.

Furthermore, according to the first embodiment, in the case where gesture operation that indicates that the operation object is unnecessary is recognized by the gesture recognition unit 22, the notification controller 20 controls the notification device not to provide a notification of a presence of the operation object. This can prevent consecutive notifications of the presence of the unnecessary operation object.

Additionally, according to the first embodiment, the notification controller 20 controls the notification device to provide a notification of a presence of the hand of the operator A that has entered or moved out of the gesture performance region 11. This enables the operator A to intuitively grasp the fact that the hand has entered or moved out of the gesture performance region 11.

Furthermore, according to the first embodiment, the gesture performance region 11 is arranged between the operator A and the operation object. This enables the operator A to intuitively perform the gesture operation while visually recognizing the operation object.

Second Embodiment

According to a first embodiment, an emphasis level calculator 21 feeds back a difference between a position of a hand of an operator A and a center position of a gesture performance region 11 to the operator A by using, in calculating an emphasis level R, a distance d from the position of the hand of the operator A to the center position of the gesture performance region 11. However, according to this method, the operator A may not be able to grasp in which direction the hand is deviated and it may take time to guide the hand to the gesture performance region 11.

Therefore, according to a second embodiment, a deviation direction of the hand of the operator A from the center position of the gesture performance region 11 detected inside or outside the gesture performance region is calculated. A notification of a presence of an operation object in a notification mode corresponding to the deviation direction is provided thereby to guide the hand of the operator A to the center position of the gesture performance region 11. This enables the operator A to grasp in which direction, upward, downward, rightward, or leftward, the hand is to be moved based on the notification of the presence of the operation object by the notification device.

A gesture guidance device 1 for a moving platform according to the second embodiment has a configuration basically same as the above-described first embodiment, but internal processing of a notification controller 20 and the emphasis level calculator 21 is different as described above. Therefore, in the following, the configuration of the gesture guidance device 1 for a moving platform according to the second embodiment will be described with reference to FIG. 1.

Figure 6:
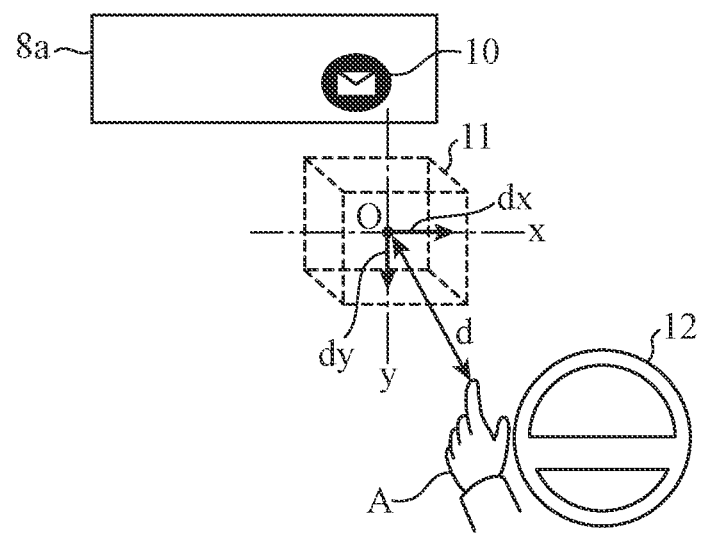
FIG. 6 is a diagram illustrating a relation between an operation object and a gesture performance region according to a second embodiment.
Figure 7:
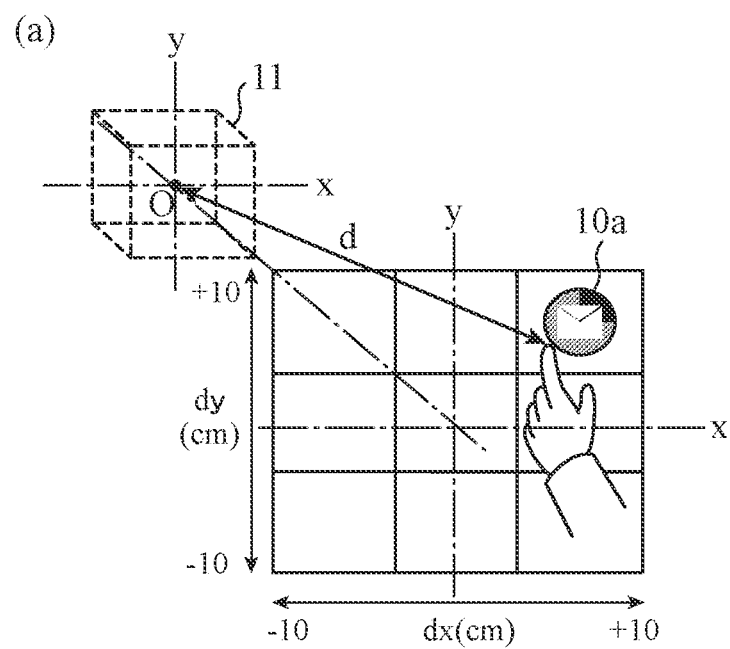
FIGS. 7(a) and 7(b) are diagrams illustrating exemplary notification modes corresponding to deviation directions of a hand of an operator with respect to a center position of the gesture performance region.
Figure 7:
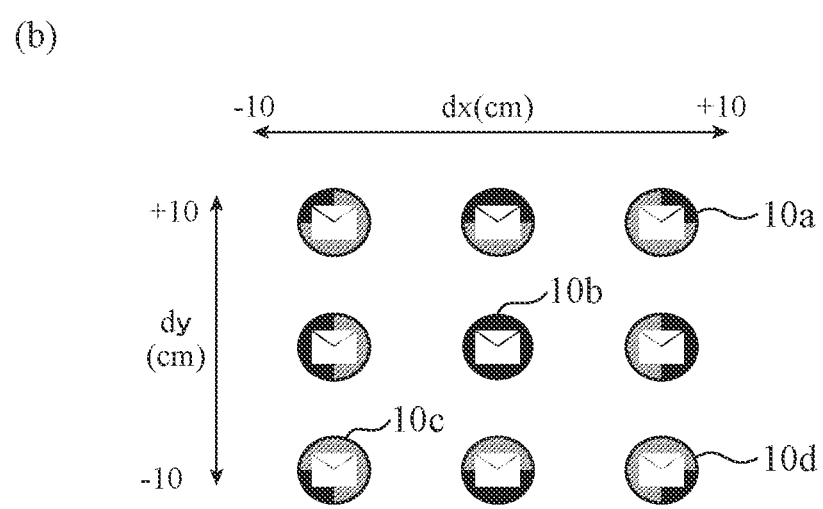

FIG. 6 is a diagram illustrating a relation between the operation object and the gesture performance region according to the second embodiment. FIGS. 7(a) and 7(b) are diagrams illustrating exemplary notification modes corresponding to the deviation directions of the hand of the operator with respect to the center position of the gesture performance region. In FIG. 6, the operator A is a driver who drives with a handle 12, and an icon 10 to be an object intended for a gesture operation is displayed on a projection member 8a of a HUD 8. The gesture performance region 11 is, for example, a parallelepiped spatial area as illustrated in FIG. 6. An xyz coordinate system having a xy plane facing the operator A side is defined, setting a center O of the gesture performance region 11 as an original.

In the second embodiment, a value dx indicating horizontal deviation of the hand of the operator A and a value dy indicating vertical deviation of the hand from the center O position of the xy plane inside the gesture performance region 11 are calculated, and the deviation direction of the hand of the operator A from the center O is specified from the values dx and dy.

Furthermore, as illustrated in FIG. 7(a), the above xy plane inside the gesture performance region 11 is projected on the operator A side, and the value dx indicating horizontal deviation of the hand of the operator A and the value dy indicating vertical deviation of the same from a center position of the projection plane of the xy plane in the hand's position of the operator A (intersecting position between the projection plane and an extension line (z axis) extending from the center O to the operator A side) are calculated, and the deviation direction of the hand of the operator A from the center position of the projection plane is specified based on dx and dy.

The emphasis level calculator 21 notifies the notification controller 20 of: the calculated emphasis level R related to the hand of the operator A detected by the 3D camera 6 inside or outside the gesture performance region 11; and the deviation direction of the hand of the operator A from the center position of the gesture performance region 11 specified as described above.

The notification controller 20 controls the notification device to provide a notification of a presence of the operation object with the emphasis level R that is calculated by the emphasis level calculator 21 and in a notification mode corresponding to the deviation direction.

For example, in the case where the operation object is the icon 10 corresponding to e-mail receipt, both dx and dy are positive values in the icon 10a as illustrated in FIG. 7(b), and the hand of the operator A is deviated in a upper right direction from the center O or a point on the extension line (z axis) extending from the center O to the operator A side (center of the projection plane of the xy plane).

Therefore, in the icon 10a, in order to visually indicate that the hand of the operator A is deviated in the upper right direction from the center O or the point on the extension line (z axis) extending from the center O to the operator A side (center of the projection plane of the xy plane), the upper right portion is displayed with the emphasis level R in accordance with to a position and a shape (distance d and dissimilarity s) of the hand of the operator A. More specifically, the upper right portion is displayed with transparency corresponding to the emphasis level R, and other portions are displayed with higher transparency than the upper right portion.

Furthermore, in an icon 10b, both dx and dy are zero, and the hand of the operator A is located at the center O or the center position of the projection plane. In the icon 10b, the entire icon is displayed with transparency corresponding to the emphasis level R in accordance with the position and shape (distance d and dissimilarity s) of the hand of the operator A as illustrated in FIG. 7(b).

In the same manner, in an icon 10c, both dx and dy are negative values, and the hand of the operator A is deviated in a lower left direction from the center O or the center of the projection plane.

Therefore, in the icon 10c, in order to visually show that the hand of the operator A is deviated in the lower left direction from the center O or the center of the projection plane, the lower left portion is displayed with transparency of the emphasis level R in accordance with the position and the shape (distance d and dissimilarity s) of the hand of the operator A, and other portions are displayed with higher transparency than the lower left portion.

In an icon 10d, dx is a positive value while dy is a negative value, and the hand of the operator A is deviated in a lower right direction from the center O or the center of the projection plane.

Therefore, in the icon 10d, in order to visually indicate that the hand of the operator A is deviated in the lower right direction from the center O or the center of the projection plane, the lower right portion is displayed with transparency of the emphasis level R in accordance with the position and shape (distance d and dissimilarity s) of the hand of the operator A and other portions are displayed with higher transparency than the lower right portion.

As described above, since the icon 10a is displayed such that only the upper right portion becomes dark, the operator A can visually grasp that the hand is deviated in the upper right direction from the center O of the gesture performance region 11 or the center of the projection plane.

On the other hand, the icon 10b has no portion of uneven darkness. Therefore, the operator A can visually grasp that the hand is located at the center O of the gesture performance region 11 or the center of the projection plane. This enables the operator A to intuitively grasp in which direction, upward, downward, rightward, or leftward, the own hand is deviated from the position of the gesture performance region 11, and can more easily perform a correct gesture operation.

Additionally, the case of changing a display mode corresponding to the deviation direction of the hand of the operator A has been described, but an acoustic mode using a sound may be changed as well. For example, different types of sounds are preliminarily set respectively for deviation in upward, downward, leftward, and rightward directions from the center O of the gesture performance region 11 or the center of the projection plane.

In the case where the hand of the operator A is deviated in the upper right direction from the center O or the point on the extension line (z axis) extending from the center O to the operator A side (center of the projection plane), a sound type corresponding to deviation in the upper right direction is output from a speaker 7.

On the other hand, in the case where the hand of the operator A is located at the center O or the center of the projection plane, a sound type corresponding to the hand located at the center is output from the speaker 7. Meanwhile, the sound output from the speaker 7 has volume corresponding to the emphasis level R.

As described above, according to the second embodiment, the hand of the operator A is detected inside or outside the gesture performance region 11 by the 3D camera 6, and the emphasis level calculator 21 calculates the deviation direction of the hand of the operator A from the center O of the gesture performance region 11 or the point on the extension line (z axis) extending from the center O to the operator A side (intersection between the projection plane of the xy plane and the z axis). Then, the notification controller 20 causes the notification device to provide the notification of a presence of the operation object with the emphasis level R calculated by the emphasis level calculator 21 and in the notification mode corresponding to the deviation direction, and guides the hand of the operator A to the center position of the gesture performance region 11.

This enables the operator A to intuitively grasp in which direction, upward, downward, leftward, or rightward, the hand is deviated from the position of the gesture performance region 11, and can more easily perform the correct gesture operation.

Third Embodiment

In a third embodiment, a case where a plurality of gesture performance regions exists will be described. By providing the plurality of gesture performance regions, places to perform a gesture operation and variety of kinds of gesture operations can be broadened.

A gesture guidance device 1 for a moving platform according to the third embodiment has a configuration basically same as an above-described first embodiment, but internal processing is different in handing the plurality of gesture performance regions as described above. Therefore, in the following, the configuration of the gesture guidance device 1 for a moving platform according to the third embodiment will be described with reference to FIG. 1.

Figure 8:
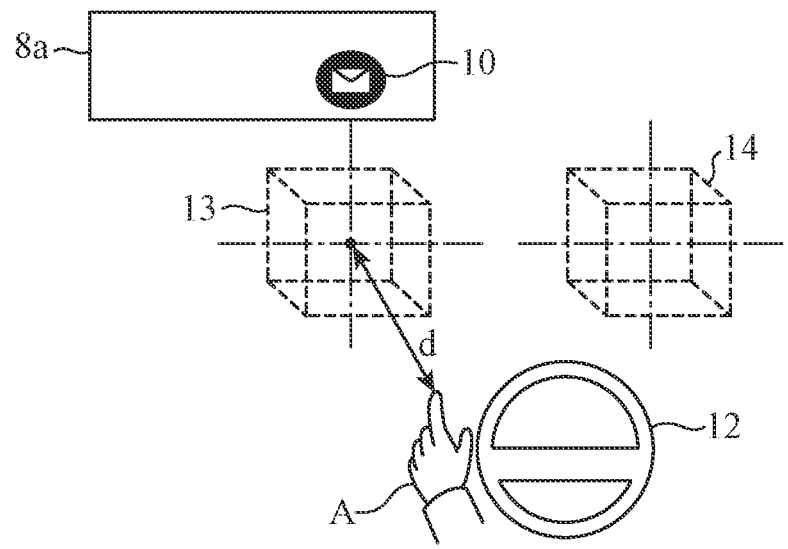
FIG. 8 is a diagram illustrating an operation object and a plurality of gesture performance regions corresponding thereto according to a third embodiment.

FIG. 8 is a diagram illustrating an operation object and the plurality of gesture performance regions corresponding thereto according to the third embodiment. In FIG. 8, an operator A is a driver who drives with a handle 12, and an icon 10 to be an object intended for a gesture operation is displayed on a projection member 8a of a HUD 8. The gesture performance regions 13, 14 are the gesture performance regions for a left hand and a right hand of the operator A against the icon 10.

In a gesture recognition unit 22, a gesture operation performed by the hand of the operator A is recognized with one-to-one correspondence between the icon 10 and the gesture performance region 13, or between the icon 10 and the gesture performance region 14. More specifically, the operator A may perform the gesture operation against the icon 10 in either one of the gesture performance regions. In the case illustrated in FIG. 8, this enables the operator A to perform the gesture operation with any hand that can be easily released from the handle 12 regardless of a dominant hand of the operator.

In the same manner, the gesture performance region for a fellow passenger in a driver's assistant seat or a rear seat may also be provided against the icon 10. This enables the fellow passenger to perform the gesture operation against the icon 10.

Figure 9:
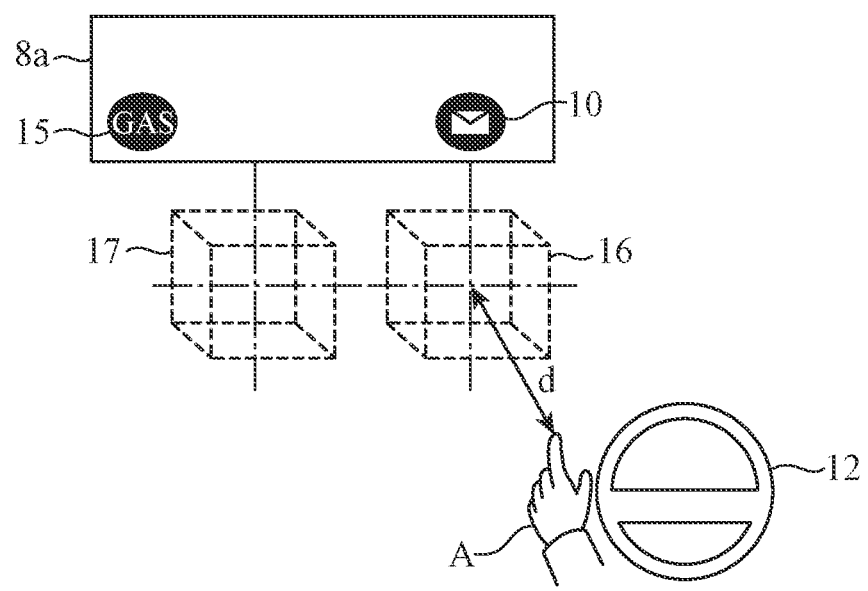
FIG. 9 is a diagram illustrating a relation between an operation object and each gesture performance region according to the third embodiment.

FIG. 9 is a diagram illustrating a relation between an operation object and each of the gesture performance regions according to the third embodiment. In FIG. 9, the operator A is a driver who drives with the handle 12, and icons 10, 15 to be objects intended for a gesture operation are displayed on the projection member 8a of the HUD 8. The icon 10 is the icon corresponding to a gesture performance region 16, and the icon 15 is the icon corresponding to the gesture performance region 17.

The operator A performs a gesture operation relative to the icon 10 inside the gesture performance region 16, thereby performing reading processing for a received e-mail. Further, the operator performs a gesture operation for the icon 15 inside the gesture performance region 17, thereby performing navigation processing to a gas station.

Since the gesture operation of a different operation object is recognized in each of the gesture performance regions, the processing corresponding to the plurality of operation objects can be performed. Furthermore, the variety of kinds of the gesture operation can be broadened by setting the gesture operation like "hand waving" as a different meaning in each of the gesture performance regions.

Figure 10:
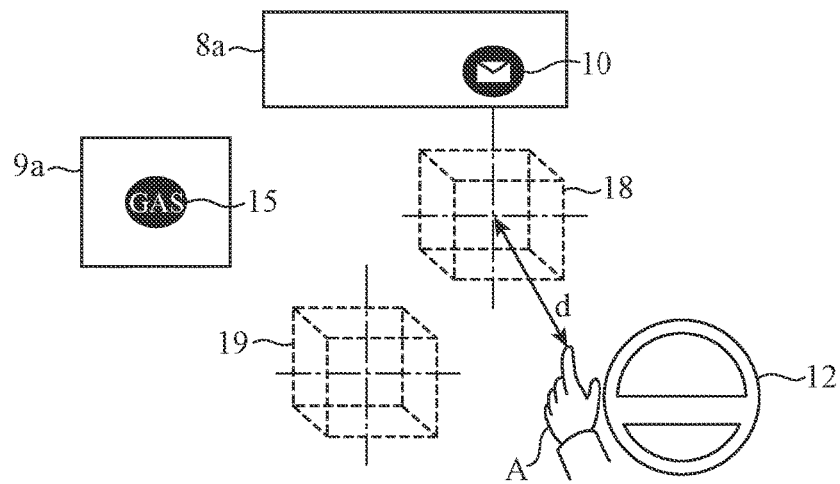
FIG. 10 is a diagram illustrating a relation between the operation object and the gesture performance region in each notification device according to the third embodiment.

FIG. 10 is a diagram illustrating a relation between the operation object and the gesture performance region in each notification device according to the third embodiment. In FIG. 10, the operator A is a driver who drives with the handle 12, and an icon 10 to be an object intended for a gesture operation is displayed on the projection member 8a of the HUD 8, and in the same manner, an icon 15 to be an object of the gesture operation is displayed on a screen 9a of a center display 9. Furthermore, a gesture performance region 18 is the gesture performance region corresponding to the icon 10, and a gesture performance region 19 is the gesture performance region corresponding to the icon 15.

In the case of recognizing the gesture operation performed by the operator A in the gesture performance region 18, the notification controller 20 outputs, to the HUD 8 associated with the gesture performance region 18, a notification command for a processing result of the gesture operation. In the same manner, in the case where the operator A performs the gesture operation in the gesture performance region 19, the notification controller 20 outputs, to the center display 9 corresponding to the gesture performance region 19, a notification command for a processing result of the gesture operation.

More specifically, the notification controller 20 performs control such that the notification device corresponding to the gesture performance region where the gesture recognition unit 22 has recognized the gesture operation outputs the processing result of the gesture operation. This enables the operator A to select the notification device from which the operator A desires to output the processing result of the gesture operation in accordance with the gesture performance region.

As described above, according to the third embodiment, the gesture performance regions are provided at a plurality of places. Therefore, the places to perform a gesture operation and the variety of kinds of gesture operations can be broadened.

For example, by providing the gesture performance regions 13, 14 for the left hand and the right hand, the operator A can perform the gesture operation with any hand that can be easily released from the handle 12 regardless of the dominant hand of the operator. Furthermore, by providing the gesture performance region for a fellow passenger besides the driver, the fellow passenger can also perform the gesture operation for the operation object.

Moreover, according to the third embodiment, the gesture recognition unit 22 recognizes the gesture operation for the different operation object in each of the gesture performance regions. Consequently, the processing corresponding to the plurality of the operation objects can be performed. Additionally, a different meaning can be set for the gesture operation like "hand waving" in each of the gesture performance regions.

Furthermore, according to the third embodiment, the notification controller 20 performs control such that the notification device corresponding to the gesture performance region where the gesture recognition unit 22 has recognized the gesture operation outputs the processing result of the gesture operation. This enables the operator A to select the notification device from which the operator desires to output the processing result of the gesture operation in accordance with the gesture performance region.

Fourth Embodiment

Figure 11:
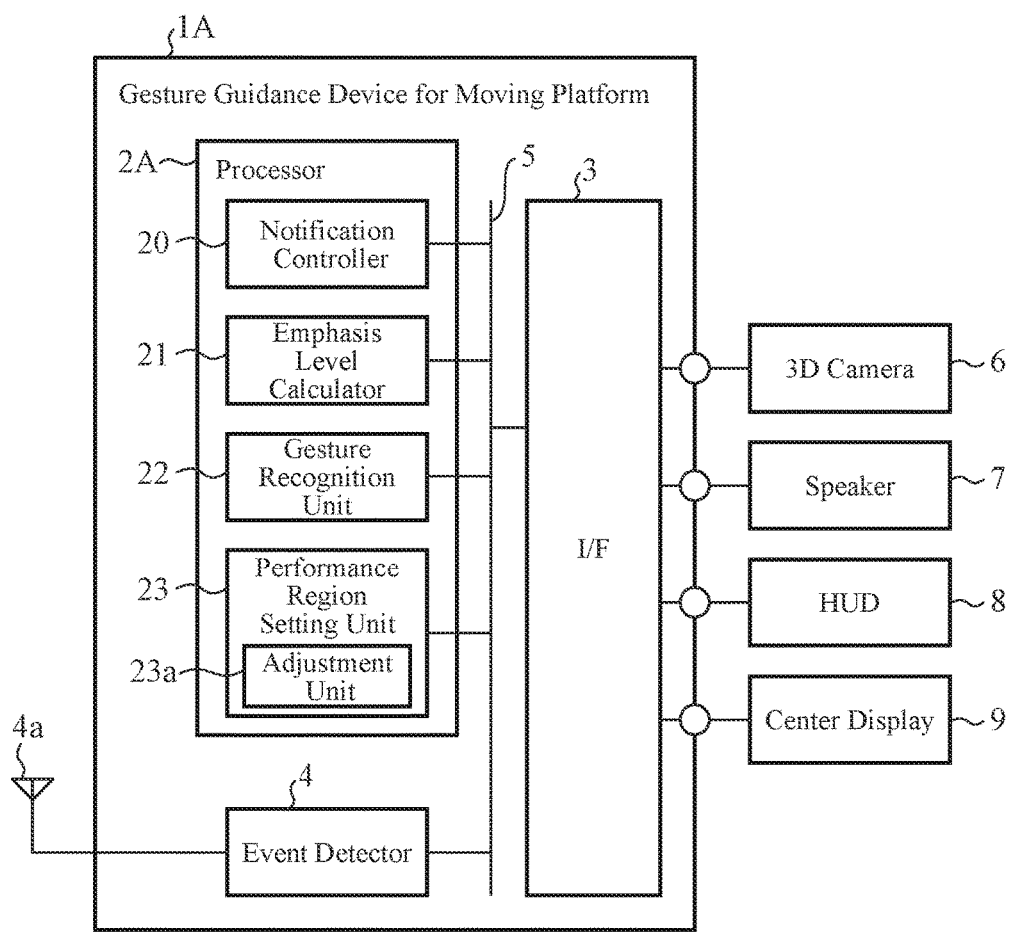
FIG. 11 is a block diagram illustrating a configuration of a gesture guidance device for a moving platform according to a fourth embodiment.

FIG. 11 is a block diagram illustrating a configuration of a gesture guidance device for a moving platform according to a fourth embodiment. In FIG. 11, a gesture guidance device 1A for a moving platform according to the fourth embodiment includes a calculator 2A different from a configuration of a first embodiment, and the calculator 2A includes a performance region setting unit 23. The performance region setting unit 23 is a position changing unit to change a position of a gesture performance region 11. Also, the performance region setting unit 23 includes an adjustment unit 23a to adjust the position of the gesture performance region 11 in accordance with a command from the outside. Note that, in FIG. 11, component same as FIG. 1 will be denoted by the same reference signs and a description therefor will be omitted.

For example, a user or a person in charge of maintenance can change the position of the gesture performance region 11 at an optional timing by using the performance region setting unit 23.

Figure 12:
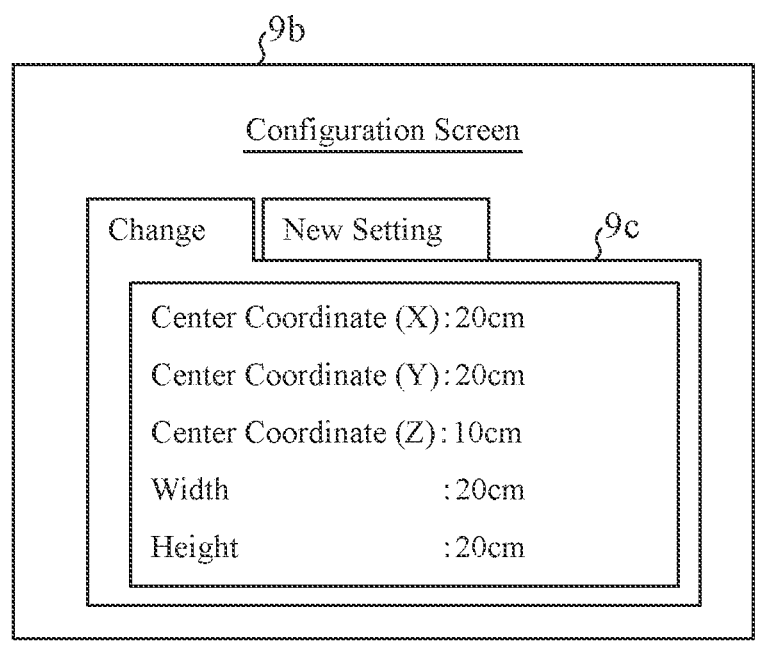
FIG. 12 is a diagram illustrating an exemplary configuration screen of a gesture performance region.

FIG. 12 is a diagram illustrating an exemplary configuration screen of the gesture performance region. First, the user or the person in charge of maintenance makes selection from a menu screen displayed on a display device such as a center display 9, and starts the performance region setting unit 23.

After the performance region setting unit 23 is started, the adjustment unit 23a displays a configuration screen 9b as illustrated in FIG. 12 on the center display 9. Meanwhile, the configuration screen may also be displayed on a HUD 8.

The configuration screen 9b includes the position coordinates of a center O of the gesture performance region (center coordinates) and a setting field 9c to set a width and a height representing a size thereof. When the user sets the center coordinates, width, and height in the setting field 9c by using an input device such as a touch panel or a hardware key, the adjustment unit 23a sets the gesture performance region 11 in a position based on the setting value. This enables the user to change the position of the gesture performance region 11 to a place where the user can easily perform the gesture operation.

In FIG. 12, for example, 10 cm is set for a normal direction (z axis) of a display surface of the HUD 8 from an operation object displayed on the HUD 8 that is a notification device to an operator A side. Additionally, under the condition that the center O is a position 10 cm distant from the display surface and the center O is set as an origin, 20 cm is set for an x axis direction (−10 cm in a −x axis direction and +10 cm in a +x axis direction via the center O) and 20 cm is set for a Y axis direction (−10 cm in a −y axis direction and +10 cm in a +y axis direction via the center O) respectively. Furthermore, 20 cm is set for the z axis direction (−10 cm in the −z axis direction and +10 cm in the +z axis direction via the center O) by setting the width to 20 cm, and a parallelepiped spatial area is defined as the gesture performance region by setting the height to 20 cm. The parallelepiped spatial area is defined from a plane where a xy surface including the center O is projected at the position of −10 cm in the z direction to a plane where the same is projected at the position of +10 cm.

Meanwhile, in the setting field 9c, any spatial position between the position of the operator A and the operation object may also be preliminarily set as an initial position of the gesture performance region 11. Consequently, since the operator A can easily perform the gesture operation at the initial position, there is no need to change the position. Therefore, setting for the position of gesture performance region 11 can be simplified.

Additionally, in FIG. 12, the case of changing the position of the gesture performance region 11 by setting the position of the operation object as a reference position has been described, but in the case where the operator A is a driver who drives with a handle 12, a position of the handle 12 may be set as the reference position (for example, left end position of the handle 12).

Moreover, the performance region setting unit 23 may learn a position of a hand of the operator A where the gesture operation is recognized by the gesture recognition unit 22, and may change the position of the gesture performance region 11 based on the learning result.

For example, the performance region setting unit 23 preliminarily sequentially stores positions of the hand where the gesture operation is performed by the operator A, and calculates: a position where the gesture operation is performed in the same position the number of times of a threshold or more out of positions where the gesture operation has been performed predetermined number of times in the past; or an average position of the gesture operation in which the gesture operation has been performed predetermined number of times in the past. Then, the performance region setting unit 23 changes the position of the gesture performance region 11 by setting the calculated position as the center O or by setting the same as an apex position or the like.

Consequently, the position of the gesture performance region 11 can be changed to a position suitable for the operator A.

In this regard, in the case where the gesture performance region 11 is located too close to the handle 12, operation of the handle 12 by the operator A may be erroneously determined as the gesture operation.

Therefore, a limit may also be provided on a position range of the gesture performance region 11 that can be changed by the performance region setting unit 23. For example, a spatial position located in a predetermined distance from the handle 12 is preliminarily set as a prohibited position in the performance region setting unit 23, and the position of the gesture performance region 11 is prevented from being changed to the prohibited position. Consequently, misrecognition of the gesture operation can be reduced.

As describe above, according to the fourth embodiment, since the performance region setting unit 23 to change the position of the gesture performance region 11 is provided, the gesture performance region is not set as a fixed position and can be moved. Additionally, since the adjustment unit 23a to adjust the position of the gesture performance region 11 in accordance with the information set by an outside is provided, the gesture performance region 11 can be set at a desired place of the operator A.

Moreover, according to the fourth embodiment, the performance region setting unit 23 learns the position of the hand of the operator A where the gesture operation is recognized, and changes the position of the gesture performance region 11 based on the learning result. Consequently, the gesture performance region 11 where the operator A can easily perform the gesture operation can be set. At this point, the limit is provided in the position range of the gesture performance region 11 changeable by the performance region setting unit 23. This can prevent the gesture performance region 11 from being set at the place where misrecognition is likely to occur, and misrecognition of the gesture operation can be reduced.

Meanwhile, in the present invention, the respective embodiments can be freely combined, any component in the respective embodiments can be modified, or any component in the respective embodiments can be omitted within the scope of the present invention.

INDUSTRIAL APPLICABILITY

A gesture guidance device for a moving platform according to the present invention is applicable to, for example, an operation device of an on-vehicle information apparatus because the device can be implemented by a simple configuration and also can perform guidance to a state in which the gesture operation is to be performed.

EXPLANATIONS OF REFERENCE NUMERALS

1, 1A Gesture guidance device for a moving platform; 2, 2A Processor; 3 I/F; 4 Event detector; 4a Antenna; 5 Bus; 6 3D Camera; 7 Speaker; 8 HUD; 8a Projection member; 9 Center display; 9a Screen; 9b Configuration Screen; 9c Setting Field; 10, 10a to 10d, 15 Icon; 11, 13, 14, 16 to 19 Gesture performance region; 12 Handle; 20 Notification controller; 21 Emphasis level calculator; 22 Gesture recognition unit; 23 Performance region setting unit; and 23a Adjustment unit.

The invention claimed is:

1. A gesture guidance device for a moving platform, comprising:
   a processor and memory configured to,
   detect a position and a shape of a hand of an operator based on information detected by a sensor that detects the hand of the operator,
   calculate an emphasis level in accordance with a difference between a combination of the position and the shape of the hand of the operator and another combination of a predetermined position for performing a gesture operation and a predetermined shape of a hand for the gesture operation,
   calculate a deviation direction of the position of the hand with respect to a center of a gesture performance region predetermined for performing the gesture operation or a point on an extension line that extends from the center of the gesture performance region to the operator, and
   control, every time the processor calculates the emphasis level in response to detection of the hand of the operator by the sensor, a notification device to display an icon of an operation object intended for the gesture operation, with transparency corresponding to the calculated emphasis level and with a planar distribution of the transparency that is deviated from a center of the display icon, depending on the calculated deviation direction, to thereby guide the hand of the operator to the predetermined position and the predetermined shape of a hand for the gesture operation.

2. The gesture guidance device for a moving platform according to claim 1, wherein the processor calculates the emphasis level, based on a distance between the position of the hand of the operator and a center position of a gesture performance region for performing the gesture operation; and a dissimilarity between the shape of the hand of the operator and the predetermined shape of a hand for the gesture operation.

3. The gesture guidance device for a moving platform according to claim 1, wherein:
   when an event related to the operation object is generated causing the processor to notify the presence of the operation object, the processor sequentially calculating an emphasis level that is gradually lowered after a set period has passed from the generation of the event; and the processor notifying the presence of the operation object, based on the emphasis level sequentially calculated thereby.

4. The gesture guidance device for a moving platform according to claim 1, wherein:
the processor issues a notification of a presence of the operation object, with the calculated emphasis level and in a notification mode corresponding to the deviation direction, to thereby guide the hand of the operator to a center position of the gesture performance region.

5. The gesture guidance device for a moving platform according to claim 1, wherein the processor further recognizes the gesture operation performed by the hand of the operator in the gesture performance region with one-to-one correspondence between the operation object and the gesture performance region.

6. The gesture guidance device for a moving platform according to claim 5, wherein, when the processor does not recognize the operation object, the processor does not issue a notification of a presence of the operation object.

7. The gesture guidance device for a moving platform according to claim 5, wherein the gesture performance region includes a plurality of gesture performance regions that are provided at a plurality of places.

8. The gesture guidance device for a moving platform according to claim 7, wherein the gesture recognition unit recognizes a gesture operation of a different operation object being in each of the gesture performance regions.

9. The gesture guidance device for a moving platform according to claim 7, wherein the processor outputs a processing result of the gesture operation when the gesture operation is recognized.

10. The gesture guidance device for a moving platform according to claim 7, wherein the plurality of gesture performance regions includes a gesture performance region for a right hand or a left hand of a driver in the moving platform or a gesture performance region for a passenger besides the driver.

11. The gesture guidance device for a moving platform according to claim 7, wherein the gesture performance region is arranged between the operator and the operation object.

12. The gesture guidance device for a moving platform according to claim 1, wherein the processor further changes a position of the gesture performance region.

13. The gesture guidance device for a moving platform according to claim 12, wherein the processor further adjusts a position of the gesture performance region in accordance with information set by an outside input.

14. The gesture guidance device for a moving platform according to claim 12, wherein the processor learns a position of the hand of the operator where a gesture operation has been recognized, and changes a position of the gesture performance region based on a result of the learning.

15. The gesture guidance device for a moving platform according to claim 14, wherein a limit is provided in a position range of the gesture performance region that is changeable by the position changing unit.

16. The gesture guidance device for a moving platform according to claim 1, wherein the processor notifies a presence of the hand of the operator that has entered or moved out of the gesture performance region.

17. A gesture guidance system for a moving platform, comprising:
a sensor configured to detect a hand of an operator;
a notification device configured to provide a notification of a presence of an operation object; and
a processor and memory configured to
detect a position and a shape of the hand of the operator based on information detected by the sensor,
calculate an emphasis level in accordance with a difference between a combination of the position and the shape of the hand of the operator and another combination of a predetermined position of a hand for performing a gesture operation and a predetermined shape of a hand for the gesture operation,
calculate a deviation direction of the position of the hand with respect to a center of a gesture performance region predetermined for performing the gesture operation or a point of an extension line that extends from the center of the gesture performance region to the operator, and
control, every time the processor calculates the emphasis level in response to detection of the hand of the operator by the sensor, the notification device to display an icon of an operation object intended for the gesture operation, with transparency corresponding to the calculated emphasis level and with a planar distribution of the transparency that is deviated from a center of the display icon, depending on the calculated deviation direction, to thereby guide the hand of the operator to the predetermined position and the predetermined shape of a hand for the gesture operation.

18. A gesture guidance method for a moving platform, comprising:
detecting a position and a shape of a hand of an operator based on information detected by a sensor that detects the hand of the operator;
calculating an emphasis level in accordance with a difference between a combination of the position and the shape of the hand of the operator and another combination of a predetermined position of a hand for performing a gesture operation and a predetermined shape of a hand for the gesture operation;
calculating a deviation direction of the position of the hand with respect to a center of a gesture performance region predetermined for performing the gesture operation or a point on an extension line that extends from the center of the gesture performance region to the operator; and
controlling, every time the emphasis level is calculated in response to detection of the hand of the operator by the sensor, a notification device to display an icon of an operation object intended for the gesture operation, with transparency corresponding to the calculated emphasis level and with a planar distribution of the transparency that is deviated from a center of the display icon, depending on the calculated deviation direction, to thereby guide the hand of the operator to the predetermined position and the predetermined shape of a hand for the gesture operation.

* * * * *